US006925977B2

(12) United States Patent
Hirowatari et al.

(10) Patent No.: US 6,925,977 B2
(45) Date of Patent: Aug. 9, 2005

(54) VALVE TIMING CONTROLLER FOR INTERNAL COMBUSTION ENGINE

(75) Inventors: Seiji Hirowatari, Toyota (JP); Masanao Idogawa, Toyota (JP); Hirohisa Kishi, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/983,665

(22) Filed: Nov. 9, 2004

(65) Prior Publication Data

US 2005/0103296 A1 May 19, 2005

(30) Foreign Application Priority Data

Nov. 19, 2003 (JP) .............................. 2003-389337

(51) Int. Cl.⁷ ................................................. F01L 1/34

(52) U.S. Cl. ............................... 123/90.17; 123/90.15; 123/90.31

(58) Field of Search ........................ 123/90.17, 90.15, 123/90.31

(56) References Cited

U.S. PATENT DOCUMENTS

| 5,562,071 A | 10/1996 | Urushihata et al. |
| 5,694,912 A | 12/1997 | Gotou et al. |
| 6,318,314 B1 | 11/2001 | Otto et al. |
| 6,516,759 B2 | 2/2003 | Takahashi et al. |
| 6,704,642 B2 | 3/2004 | Moriya et al. ............... 701/115 |
| 2003/0000489 A1 | 1/2003 | Majima et al. |
| 2003/0131812 A1 * | 7/2003 | Hosoya ................... 123/90.16 |

FOREIGN PATENT DOCUMENTS

| EP | 1 340 887 A2 | 9/2003 |
| JP | 2004-137901 | 5/2004 |

* cited by examiner

Primary Examiner—Thomas Denion
Assistant Examiner—Zelalem Eshete
(74) Attorney, Agent, or Firm—Kenyon & Kenyon (57) ABSTRACT

A controller for controlling a valve timing of an engine that calculates a duty correction value using an arithmetic expression reflecting a physical model, which is associated with torque applied to an exhaust valve camshaft, a spring force exerted by an advancing spring for varying a rotational phase of the exhaust valve camshaft, and hydraulic pressure of operating oil. When the coolant temperature is lower than 80° C., the controller sets the duty correction value to zero. The duty correction value reflecting all the fluctuation factors of the engine is easily obtained without using a map requiring a large amount of data.

33 Claims, 4 Drawing Sheets

Rotation direction

Fig. 5

VALVE TIMING CONTROLLER FOR INTERNAL COMBUSTION ENGINE

CROSS-REFERENCE TO RELATED APPLICATIONS

This application is based upon and claims the benefit of priority from prior Japanese Patent Application No. 2003-389337, filed on Nov. 19, 2003, the entire contents of which are incorporated herein by reference.

BACKGROUND OF THE INVENTION

The present invention relates to a valve timing controller for an internal combustion engine, which varies an operation timing of a valve by controlling the pressure of an operating fluid.

Japanese Laid-Open Patent Publication No. 2001-317382 discloses a conventional hydraulic drive variable valve timing mechanism. The variable valve timing mechanism is arranged between a crankshaft and a camshaft of an internal combustion engine. The variable valve timing mechanism controls the pressure of its internal pressure chamber to adjust the rotational phase of the valve camshaft with respect to the crank angle. In this way, the variable valve timing mechanism varies the operation timing of valves (valve timing).

To achieve accuracy and responsiveness in valve timing control, it is important to always use a correct holding control value for holding a target valve timing.

In reality, however, the torque applied to the valve camshaft fluctuates according to the operational status of the internal combustion engine. A spring force exerted by a spring mechanism, which is arranged in the variable valve timing mechanism, fluctuates according to the valve timing. Further, the hydraulic pressure for driving the variable valve timing mechanism fluctuates. These fluctuations change the holding control value.

To obtain an appropriate holding control value, correction values corresponding to these individual fluctuation factors are conventionally calculated based on the valve timing, the engine speed, and detection values of the water temperature and the hydraulic pressure. The correction values are then added to a learned value of the holding control value (to a holding duty ratio for the above conventional technique), to yield an appropriate holding control value. The holding control value calculated in this way is used to control the variable valve timing mechanism.

The learned value is calculated by detecting an actual holding control value, which is obtained while the valve timing is stabilized, and subtracting a correction value from the stabilized state holding control value. The learned value as calculated is stored in this way.

To calculate the correction values corresponding to the individual fluctuation factors, maps individually created for these fluctuation factors are usually used. A valve timing controller is required to have a large memory capacity for storing a large amount of data corresponding to a large number of fluctuation factors.

Further, the above-described fluctuation factors of the holding control value may not be individually reflected in the holding control value, but rather may influence one another. Specific valve timing control or some types of internal combustion engines may have to consider such mutual influences of the fluctuation factors. In particular, a certain temperature of an operating fluid, such as operating oil, may cause other fluctuation factors to influence one another differently. Thus, the conventional method of calculating the correction values respectively from the individual fluctuation factors using their maps and simply adding the correction values to the learned value may fail to yield a highly accurate holding control value. A less accurate holding control value may cause problems in the valve timing control.

To solve such problems associated with mutual influences of the fluctuation factors, a multidimensional map, which has all the fluctuation factors as parameters, may be used. With the multidimensional map, correction values considering such mutual influences are calculated. However, this case requires a further complex map to be created. Creating a complex map requires enormous efforts. Further, such a map needs to be created for each type of variable valve timing mechanisms and each type of engine, and further for each different variable valve timing mechanism and each different engine design. This further increases the work required for creating a map. Moreover, with an enormous amount of data for such a map, a valve timing controller installed in an actual engine control system is required to have a large memory capacity. Also, the valve timing controller involves a large amount of computations in its valve timing control. This inevitably increases the size of the valve timing controller.

SUMMARY OF THE INVENTION

It is an object of the present invention to provide a valve timing controller that executes favorable valve timing control over an actual engine without using a large number of maps or a complex map.

One aspect of the present invention is a controller for controlling a variable valve timing mechanism that varies an operation timing of a valve camshaft for an internal combustion engine. The variable valve timing mechanism varies a rotational phase of the valve camshaft with respect to a crank angle by controlling pressure of an operating fluid. The controller includes a calculation means for calculating a correction value using an arithmetic expression reflecting a physical model that is associated with torque applied to the valve camshaft and the pressure of the operating fluid. The correction value is the difference between a holding control value for fixing the rotational phase and a reference-state holding control value. The holding control value is calculated from the torque applied to the valve camshaft and the pressure of the operating fluid. The reference-state holding control value is calculated from a reference torque and a reference pressure. A valve timing controlling means generates an updated holding control value that includes the sum of the correction value and a predetermined control reference value. The valve timing controlling means also controls the valve timing in accordance with the updated holding control value.

Another aspect of the present invention is a controller for controlling a variable valve timing mechanism that varies an operation timing of a valve camshaft for an internal combustion engine. The variable valve timing mechanism varies a rotational phase of the valve camshaft with respect to a crank angle by controlling pressure of an operating fluid. The controller includes a calculation means for calculating a correction value using an arithmetic expression reflecting a physical model that is associated with torque applied to the valve camshaft, a spring force for varying the rotational phase, and the pressure of the operating fluid. The correction value is the difference between a holding control value for fixing the rotational phase and a reference-state holding control value. The holding control value is calculated from the torque applied to the valve camshaft, the spring force for varying the rotational phase, and the pressure of the operating fluid. The reference-state holding control value is calculated from a reference torque, a reference spring force, and a reference pressure. A valve timing controlling means generates an updated holding control value, which includes the sum of the correction value and a predetermined control reference value, and controls the valve timing in accordance with the updated holding control value.

A further aspect of the present invention is a method for controlling a variable valve timing mechanism that varies an operation timing of a valve camshaft for an internal combustion engine. The variable valve timing mechanism varies a rotational phase of the valve camshaft with respect to a crank angle by controlling pressure of an operating fluid. The method includes calculating a correction value using an arithmetic expression reflecting a physical model that is associated with torque applied to the valve camshaft and the pressure of the operating fluid. The correction value is the difference between a holding control value for fixing the rotational phase and a reference-state holding control value. The holding control value is calculated from the torque applied to the valve camshaft and the pressure of the operating fluid. The reference-state holding control value is calculated from a reference torque and a reference pressure. The method further includes generating an updated holding control value that includes a sum of the correction value and a predetermined control reference value, and controlling the valve timing in accordance with the updated holding control value.

Another aspect of the present invention is a method for controlling a variable valve timing mechanism that varies an operation timing of a valve camshaft for an internal combustion engine. The variable valve timing mechanism varies a rotational phase of the valve camshaft with respect to a crank angle by controlling pressure of an operating fluid. The method includes calculating a correction value using an arithmetic expression reflecting a physical model that is associated with torque applied to the valve camshaft, a spring force for varying the rotational phase, and the pressure of the operating fluid. The correction value is the difference between a holding control value for fixing the rotational phase and a reference-state holding control value. The holding control value is calculated from the torque applied to the valve camshaft, the spring force for varying the rotational phase, and the pressure of the operating fluid. The reference-state holding control value is calculated from a reference torque, a reference spring force, and a reference pressure. The method further includes generating an updated holding control value that includes the sum of the correction value and a predetermined control reference value, and controlling the valve timing in accordance with the updated holding control value.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

The following describes a valve timing controller according to a first embodiment of the present invention.

Figure 1:
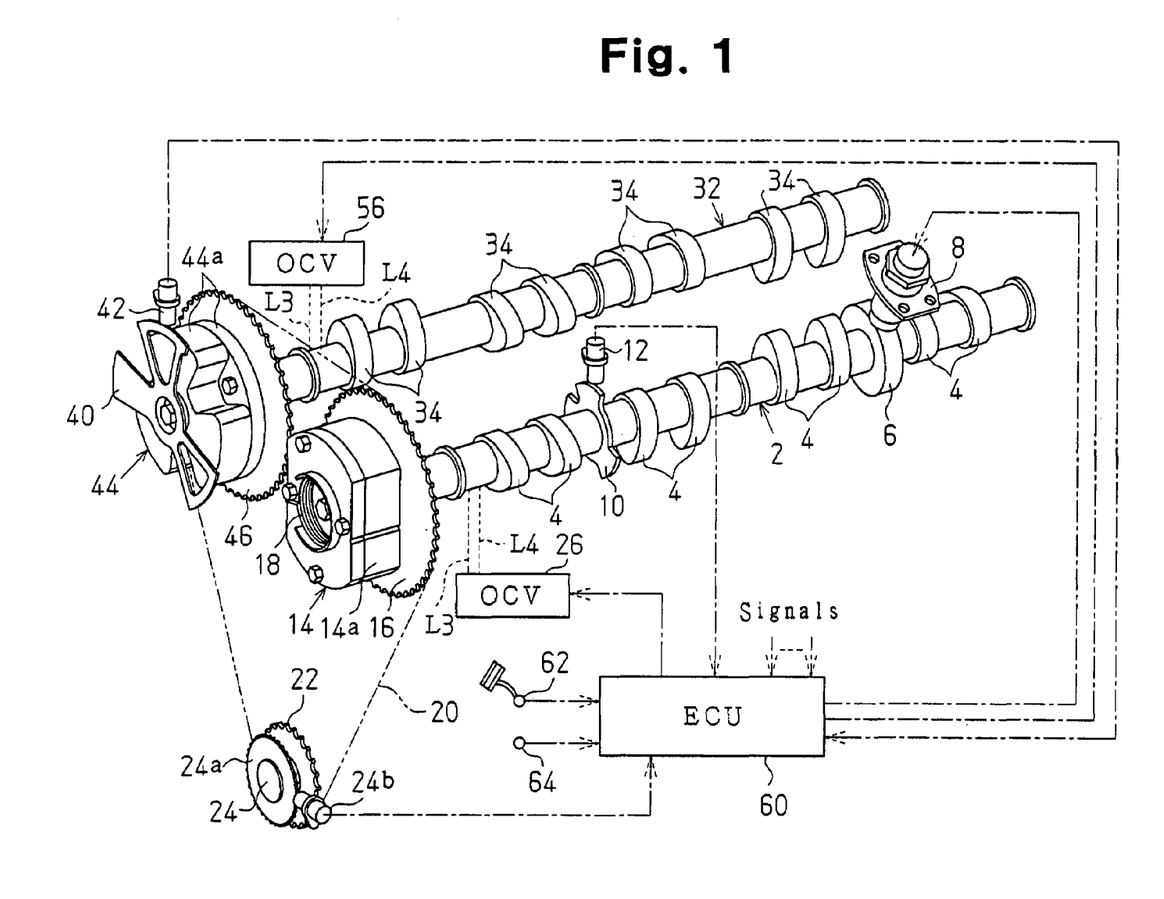
FIG. 1 is a schematic perspective view of a valve timing controller according to a first embodiment of the present invention.

FIG. 1 shows a valve timing controller according to a first embodiment of the present invention. The valve timing controller is applied to an inline four-cylinder gasoline engine. The engine is a four-valve engine, which has two intake valves and two exhaust valves in each of its cylinders. Four pairs of (eight) exhaust cams 4 are arranged on an exhaust valve camshaft 2. A high-pressure fuel pump cam 6, which has an oval shape, is arranged on the exhaust valve camshaft 2. The high-pressure fuel pump cam 6 rotates together with the exhaust valve camshaft 2 so as to drive a plunger of a high-pressure fuel pump 8. The plunger pressurizes low-pressure fuel, which is supplied from a feed pump (not shown), to high-pressure fuel. The high-pressure fuel is supplied to a high-pressure fuel distribution tube (not shown). The high-pressure fuel distribution tube distributes the high-pressure fuel to a fuel injection valve for directly injecting fuel into each combustion chamber. A rotor 10, used to detect the cam angle of the exhaust cams 4, is arranged on the exhaust valve camshaft 2. An exhaust cam position sensor 12 detects the rotational phase of the rotor 10.

A variable valve timing mechanism 14 is arranged at the distal end of the exhaust valve camshaft 2. The variable valve timing mechanism 14 has a case 14a integrally formed with a timing sprocket 16. The variable valve timing mechanism 14 connects the exhaust valve camshaft 2 and the timing sprocket 16.

Figure 2:
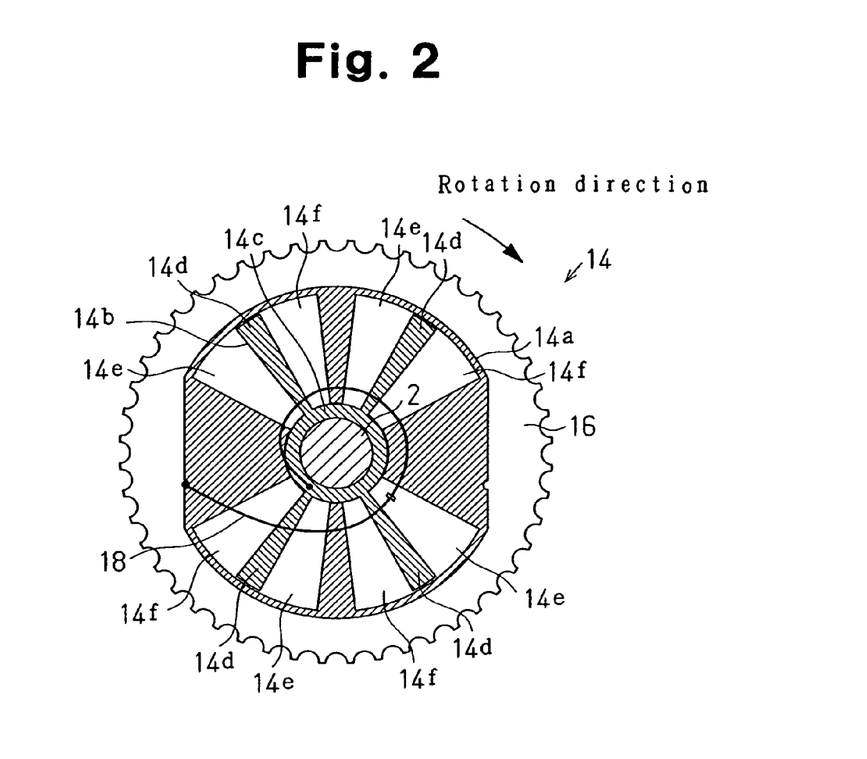
FIG. 2 is a schematic cross sectional view of a variable valve timing mechanism for exhaust valves.

The structure of the variable valve timing mechanism 14 will now be described with reference to FIG. 2. The variable valve timing mechanism 14 includes the case 14a and a vane member 14b. The vane member 14b includes a shaft sleeve 14c and four vanes 14d. The shaft sleeve 14c, which is fixed to the distal end of the exhaust valve camshaft 2; rotates together with the exhaust valve camshaft 2. The vanes 14d extend in the radial direction from the shaft sleeve 14c. The vanes 14d are arranged within the case 14a. A hydraulic chamber, which is defined in the case 14a, is partitioned into advancing side pressurizing chambers 14e and retarding side pressurizing chambers 14f by the vanes 14d.

An advancing spring 18 connects the case 14a and the vane member 14b. When flexed, the advancing spring 18 exerts a spring force, which causes the vane member 14b to rotate relatively to the case 14a in the rotation direction. The spring force exerted by the advancing spring 18 rotates the exhaust valve camshaft 2 relatively to the case 14a toward the advancing side, that is, the side for advancing the valve timing. Rotation of a crankshaft 24 is transmitted to the case 14a via the timing sprocket 16, a timing chain 20, and a timing sprocket 22, so that the case 14a rotates in synchronization with the rotation of the crankshaft 24. When hydraulic pressure of an operating fluid, or operating oil, is not applied to the advancing side pressurizing chambers 14e and the retarding side pressurizing chambers 14f, the exhaust valve camshaft 2 operates the exhaust valves at the most advanced valve timing.

Figure 3:
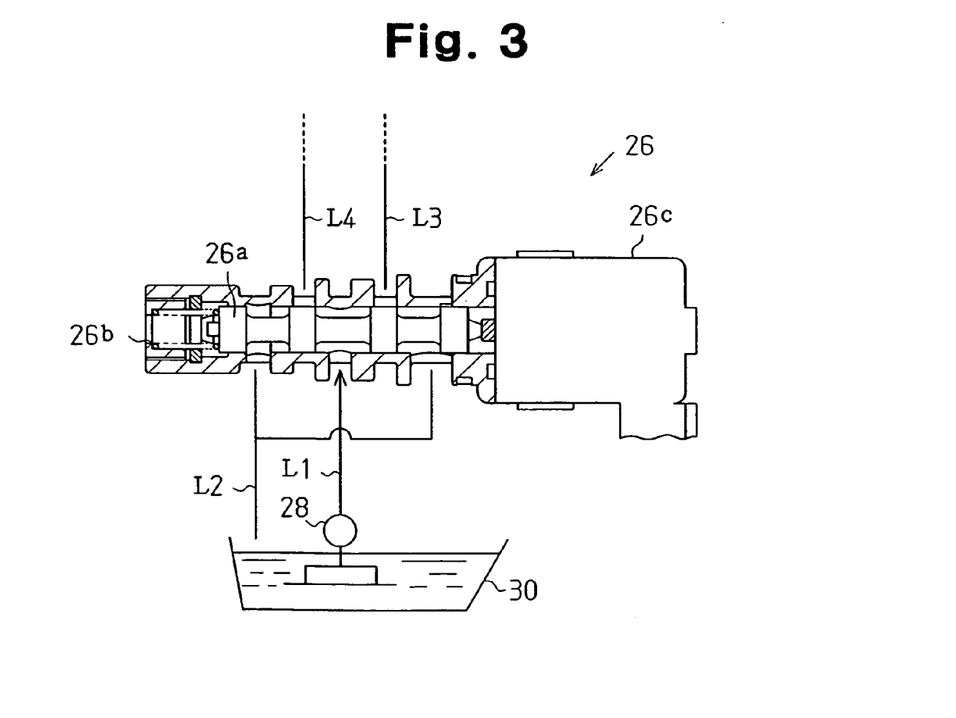
FIG. 3 is a partial cutaway view of an OCV.

As shown in FIG. 3, a hydraulic pump 28, which is driven by the engine, pumps up operating oil from an oil pan 30. The operating oil is supplied to each advancing side pressurizing chamber 14e and each retarding side pressurizing chamber 14f via an oil control valve (OCV) 26 for exhaust valves, a journal bearing, and the exhaust valve camshaft 2. The exhaust valve OCV 26 changes the amount of operating oil supplied to the advancing side pressurizing chambers 14e and the amount of operating oil supplied to the retarding side pressurizing chambers 14f, to adjust the difference between the pressure of operating oil (hydraulic pressure) in the advancing side pressurizing chambers 14e and the pressure of operating oil (hydraulic pressure) in the retarding side pressurizing chambers 14f. In detail, the exhaust valve OCV 26 moves the vanes 14d to increase the volume of the advancing side pressurizing chambers 14e and decrease the volume of the retarding side pressurizing chambers 14f when advancing the exhaust valve timing. The exhaust valve OCV 26 moves the vanes 14d to increase the volume of the retarding side pressurizing chambers 14f and decrease the volume of the advancing side pressurizing chambers 14e when retarding the exhaust valve timing. The exhaust valve OCV 26 adjusts the hydraulic pressure difference so that the vanes 14d remain unmoved, that is, so that the capacities of the pressurizing chambers 14e and 14f remain unchanged so that the valve timing is held at a target exhaust valve timing.

The exhaust valve OCV 26 will now be described in detail. As shown in FIG. 3, the hydraulic pump 28 is driven by rotation of the crankshaft 24, and supplies operating oil, which is pumped up from the oil pan 30 and is pressurized, to the exhaust valve OCV 26 via an oil supply passage L1.

In the first embodiment, the exhaust valve OCV 26 is a solenoid-operated valve having five ports. The oil supply passage L1, an oil drain passage L2, an advancing side oil passage L3, and a retarding side oil passage L4 are connected to the ports of the exhaust valve OCV 26. The oil drain passage L2 drains operating oil back to the oil pan 30. The advancing side oil passage L3 is connected to the advancing side pressurizing chambers 14e of the variable valve timing mechanism 14. The retarding side oil passage L4 is connected to the retarding side pressurizing chambers 14f of the variable valve timing mechanism 14.

The exhaust valve OCV 26 includes a spool 26a that reciprocates, a spring 26b, and an electromagnetic solenoid 26c. The spring 26b exerts force on the spool 26a in a pulling direction (toward the left in FIG. 3). The electromagnetic solenoid 26c attracts the spool 26a to the right in FIG. 3 with electromagnetic force that is in accordance with a drive signal. The position of the spool 26a within the exhaust valve OCV 26 is determined by the balance between the force exerted by the spring 26b and the electromagnetic force generated by the electromagnetic solenoid 26c. The drive signal provided to the electromagnetic solenoid 26c has a variable control duty. The movement of the spool 26a changes the connected ports, that is, the connection among the oil passages within the exhaust valve OCV 26.

The advancing side oil passage L3 connected to the advancing side pressurizing chambers 14e is connected to the oil supply passage L1 or to the oil drain passage L2 depending on the position of the spool 26a. When the advancing side oil passage L3 is connected to the oil supply passage L1, operating oil is supplied to the advancing side pressurizing chambers 14e to increase the hydraulic pressure within the advancing side pressurizing chambers 14e. When the advancing side oil passage L3 is connected to the oil drain passage L2, operating oil is drained from the advancing side pressurizing chambers 14e to decrease the hydraulic pressure within the advancing side pressurizing chambers 14e.

The retarding side oil passage L4 connected to the retarding side pressurizing chambers 14f is connected to the oil supply passage L1 or to the oil drain passage L2 depending on the position of the spool 26a. When the retarding side oil passage L4 is connected to the oil supply passage L1, operating oil is supplied to the retarding side pressurizing chambers 14f to increase the hydraulic pressure within the retarding side pressurizing chambers 14f. When the retarding side oil passage L4 is connected to the oil drain passage L2, operating oil is drained from the retarding side pressurizing chambers 14f to decrease the hydraulic pressure within the retarding side pressurizing chambers 14f.

The amount of connection among the oil passages (the flow passage area) changes depending on the position of the spool 26a. Adjustment of the flow area adjusts the supply amount and the drain amount of operating oil to and from the advancing side pressurizing chambers 14e and the retarding side pressurizing chambers 14f. In the first embodiment, the supply amount or the drain amount of operating oil is adjusted so that the ratio of the hydraulic pressure of the retarding side pressurizing chambers 14f with respect to the hydraulic pressure of the advancing side pressurizing chambers 14e increases as the control duty of the drive signal provided to the electromagnetic solenoid 26c decreases. According to the control duty of the drive signal provided to the electromagnetic solenoid 26c, the variable valve timing mechanism 14 adjusts the rotational phase of the exhaust valve camshaft 2 with respect to the crank angle. This structure enables the exhaust valve timing to be adjusted freely in a certain range.

The engine includes an intake valve camshaft 32, which is arranged in parallel with the exhaust valve camshaft 2. The intake valve camshaft 32 includes four pairs of (eight) intake cams 34. A variable valve timing mechanism 44 is arranged at the distal end of the intake valve camshaft 32. The variable valve timing mechanism 44 has a case 44a integrally formed with a timing sprocket 46. In other words, the intake valve camshaft 32 and the timing sprocket 46 are connected by the variable valve timing mechanism 44.

Figure 4:
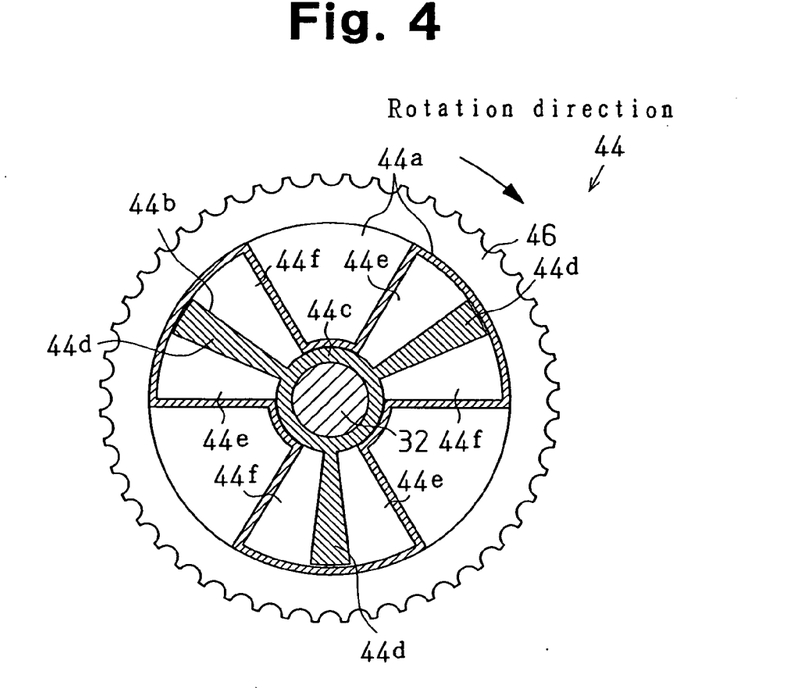
FIG. 4 is a schematic cross sectional view of a variable valve timing mechanism for intake valves.

The variable valve timing mechanism 44 will now be described with reference to FIG. 4. The variable valve timing mechanism 44 includes a case 44a and a vane member 44b. The vane member 44b includes a shaft sleeve 44c and three vanes 44d. The shaft sleeve 44c is fixed to the distal end of the intake valve camshaft 32 and rotates together with the intake valve camshaft 32. The vanes 44d extend in the radial direction from the shaft sleeve 44c. The vanes 44d are arranged within the case 44a. A hydraulic chamber, which is defined in the case 44a, is partitioned into advancing side pressurizing chambers 44e and retarding side pressurizing chambers 44f by the vanes 44d.

The variable valve timing mechanism 44 includes an OCV 56 for intake valves, which has the same structure as that of the exhaust valve OCV 26 of the exhaust variable valve timing mechanism 14 described above. The intake valve OCV 56 adjusts the hydraulic pressure of the advancing side pressurizing chambers 44e and the hydraulic pressure of the retarding side pressurizing chambers 44f in the same manner as for the exhaust valve OCV 26. The variable valve timing mechanism 44 adjusts the rotational phase of the intake valve camshaft 32 with respect to the crank angle according to a control duty of a drive signal provided to an electromagnetic solenoid included in the intake valve OCV 56. This structure enables the intake valve timing to be adjusted freely in a certain range.

The variable valve timing mechanism 44 does not include a member corresponding to the advancing spring 18 included in the exhaust variable valve timing mechanism 14. Further, the intake valve camshaft 32 does not include a member corresponding to the high-pressure fuel pump cam 6.

On the intake valve camshaft 32, a rotor 40 is arranged at a position closer to the distal end of the camshaft 32 than the variable valve timing mechanism 44. The rotor 40 rotates integrally with the intake valve camshaft 32. An intake cam position sensor 42 detects the rotational angle of the rotor 40. The rotational angle of the rotor 40 corresponds to the rotational phase of the intake valve camshaft 32, that is, the cam angle of the intake cams 34.

An electronic control unit (ECU) 60 controls the duty of drive signals provided to the electromagnetic solenoids of the OCVs 26 and 56. The ECU 60 is provided with cam angle signals from the exhaust cam position sensor 12 and the intake cam position sensor 42. The ECU 60 is provided with an engine speed signal from an engine speed sensor 24b, which detects the rotation of a rotor 24a (i.e., engine speed ene) arranged on the crankshaft 24. Further, the ECU 60 is provided with various signals such as signals indicating an accelerator depression amount and a coolant temperature ethw from sensors such as an accelerator depression amount sensor 62 and a coolant temperature sensor 64. Based on these detection signals, the ECU 60 controls the OCVs 26 and 56, the high-pressure fuel pump 8, and the fuel injection valve.

Figure 5:
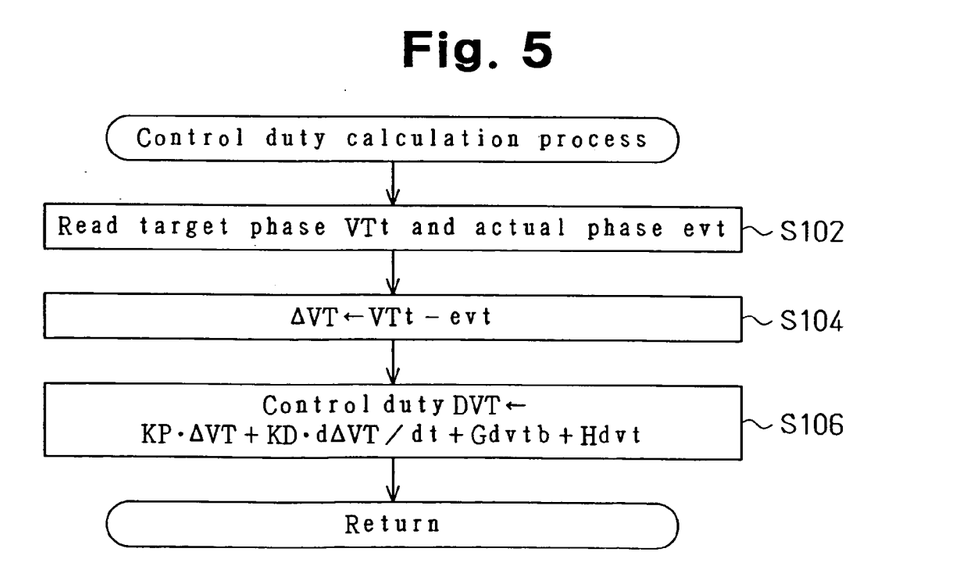
FIG. 5 is a flowchart of a control duty calculation process according to the first embodiment.

Next, the exhaust valve timing control will be described. FIG. 5 is a flowchart of a control duty calculation process, which is a feedback control, as one example of the valve timing control of exhaust valves. The ECU 60 repeatedly executes this process in timed cycles.

First, the ECU 60 calculates an actual phase evt of the exhaust variable valve timing mechanism 14 from the relationship between the detection timing of a detection signal of the engine speed sensor 24b and the detection timing of a detection signal of the exhaust cam position sensor 12. The ECU 60 calculates the engine speed ene from a detection signal of the engine speed sensor 24b, and calculates the engine load (or the fuel injection amount) from an accelerator depression amount. The ECU 60 detects the present operational status of the engine from the engine speed ene and the engine load. The ECU 60 calculates a target phase VTt corresponding to a target valve timing, which is appropriate for the present operational status of the engine based on a map obtained through experiments. The ECU 60 reads the calculated actual phase evt and the calculated target phase VTt into a memory work area of the ECU 60 (S102).

The ECU 60 calculates the difference ΔVT between the target phase VTt and the actual phase evt (i.e., VTt-evt) (S104). The ECU 60 calculates a control duty DVT according to the difference ΔVT, using expression 1 given below (S106).

$$DVT \leftarrow KP \cdot \Delta VT + KD \cdot d\Delta VT/dt + Gdvtb + Hdvt \quad \text{Expression 1}$$

In the expression, dΔVT/dt is the derivative value of the difference ΔVT, KP a feedback proportional gain, KD a feedback derivative gain, Gdvtb a holding duty learned value, and Hdvt a duty correction value. The holding duty learned value Gdvtb and the duty correction value Hdvt are calculated through a duty correction value Hdvt calculation process, which will be described later.

The ECU 60 provides the exhaust valve OCV 26 with a drive signal having a duty corresponding to the calculated control duty DVT. Then, feedback control is executed so that the hydraulic pressure in the advancing side pressurizing chambers 14e and the hydraulic pressure in the retarding side pressurizing chambers 14f in the exhaust variable valve timing mechanism 14 are adjusted to make the actual phase evt of the exhaust valves approach its target phase VTt, that is, to make the exhaust valve timing approach its target valve timing.

The process for calculating the holding duty learned value Gdvtb and the duty correction value Hdvt will now be described with reference to FIG. 6. This process is repeatedly executed in timed cycles.

When the process is started, the ECU 60 reads the coolant temperature ethw, the engine speed ene, the actual phase evt of the exhaust valves, and a pump load epduty of the high-pressure fuel pump 8 into its memory work area (S202). The pump load epduty is a duty control value of a drive signal, which is provided to the high-pressure fuel pump 8 from the ECU 60. The high-pressure fuel pump 8 supplies the amount of fuel that corresponds to the pump load epduty to the high-pressure fuel distribution tube.

The ECU 60 determines whether the coolant temperature ethw is not lower than 80° C. (corresponding to a low-temperature determination value) (S204). The calculation process of the duty correction value Hdvt has a different procedure depending on whether the coolant temperature ethw is lower than 80° C. or the coolant temperature ethw is not lower than 80° C. This is due to the following reasons. When the coolant temperature ethw is lower than 80° C., the amount of operating oil that leaks out of the passage supplying operating oil from the hydraulic pump 28 is relatively small. Thus, the hydraulic pressure applied to the exhaust variable valve timing mechanism 14 is high. In this case, factors other than the hydraulic pressure have only a little influence on a holding control value, which is described later.

When ethw≧80° C. is satisfied (YES in S204), the ECU 60 calculates the duty correction value Hdvt using expression 2 given below.

$$Hdvt \leftarrow A \cdot (1/ene - 1/NEB) + B \cdot (evt - VTB) + K \cdot (epduty - TPB) \quad \text{Expression 2}$$

In the expression, coefficients A, B, and K are used to convert the calculated values in the parentheses into duty values (%) and are constants in the first embodiment. Further, NEB is a reference engine speed, VTB a reference phase, and TPB a reference value, and these are constants expressing respective freely set reference states. Expression 2 describes a simple physical model.

Part of the right side of expression 2, or "A/ene+B·evt+ K·epduty", corresponds to the holding control value, which is a control duty used by the exhaust variable valve timing mechanism 14 to actually hold the actual phase evt of the exhaust valves. Further, part of the right side of expression 2, or "A/NEB+B·VTB+K·TPB", corresponds to a reference-state holding control value, which is a control duty used to hold the reference phase VTB in a reference state. In this way, expression 2 indicates that the duty correction value Hdvt is calculated as a difference between the holding control value for holding the actual phase evt and the reference-state holding control value.

In expression 2, it is preferable to use, as the engine speed ene, a value obtained through such computation as a weighted mean to reduce influence from short fluctuations, rather than directly using a detection value of the engine speed sensor 24b. The same applies to the actual phase evt of the exhaust valves. It is preferable to use, as the actual phase evt, a value obtained through such computation as a weighted mean to reduce influence from short fluctuations, rather than directly using a value derived from detection values of the exhaust cam position sensor 12 and the engine speed sensor 24b.

The same further applies to the pump load epduty. As the pump load epduty, a value corresponding to the amount of fuel injected from the high-pressure fuel pump 8 is not directly used, but a value obtained through such computation as a weighted mean to reduce influence from short fluctuations is used. The amount of fuel injected from the high-pressure fuel pump 8 fluctuates more as the engine load increases. Thus, it is preferable to use, as the pump load epduty, such a value obtained to further reduce influence from short fluctuations as the engine load increases.

When ethw<80° C. is satisfied (NO in S204), factors other than the hydraulic pressure have little influence on the holding control value. Thus, the ECU 60 sets the duty correction value Hdvt to zero percent (S208).

When the duty correction value Hdvt is calculated in step S206 or S208, the ECU 60 determines whether a learned value updating condition is satisfied (S210). The following conditions are used to determine whether the learned value updating condition is satisfied.

(1) An absolute value |VTt-evt| of the difference between the target phase VTt and the actual phase evt is sufficiently small. In other words, the actual phase evt substantially matches (converges on) the target phase VTt.

(2) The fluctuation amount of the actual phase evt and the fluctuation amount of the control duty DVT remain sufficiently small during a fixed period.

When the two conditions are satisfied, the ECU 60 determines that the learned value updating condition is satisfied.

When the learned value updating condition is not satisfied (NO in S210), the ECU 60 terminates the process without updating the holding duty learned value Gdvtb. When the learned value updating condition is satisfied (YES in S210), the ECU 60 updates the holding duty learned value Gdvtb (corresponding to a control reference value and a learned value), using expression 3 given below.

$$Gdvtb \leftarrow DVT - Hdvt \quad \text{Expression 3}$$

The control duty DVT obtained when the learned value updating condition is satisfied is an actual holding control value in the present operational status of the engine. The duty correction value Hdvt corresponds to the fluctuation amount of the holding control value according to the engine operational status. Thus, subtracting the duty correction value Hdvt from the control duty DVT yields the holding duty learned value Gdvtb, which indicates the level of a basic holding control value used by the variable valve timing mechanism 14 that is not in accordance with the engine operational status.

In this way, the duty correction value Hdvt is calculated, and the holding duty learned value Gdvtb is updated. With the learned value being updated, an appropriate holding control value is set as the sum of the holding duty learned value Gdvtb and the duty correction value Hdvt ("Gdvtb+Hdvt") in the feedback computation (expression 1) of the control duty calculation process (FIG. 5). In this way, an appropriate control duty DVT is calculated at all times. An appropriate holding control value is set as the value of "Gdvtb+Hdvt" not only in the feedback control shown in FIG. 5, but also in other cases such as open loop control. In this way, an appropriate control duty is calculated at all times.

The following describes the simple physical model described by expression 2. The holding control value, which enables the exhaust valve OCV 26 to maintain the actual phase evt in a fixed state, fluctuates due to the following factors.

[Engine Speed] A load torque applied to the exhaust valve camshaft 2 fluctuates according to the engine speed ene. The holding control value fluctuates according to the load torque. Further, the hydraulic pressure generated by the hydraulic pressure pump 28, which is driven by the engine, increases as the engine speed ene increases. This decreases the fluctuation range of the holding control value.

[Spring Force] The spring force exerted by the advancing spring 18 fluctuates according to the actual phase evt. The holding control value fluctuates according to the spring force.

[Load of High-Pressure Fuel Pump] The load torque applied to the exhaust valve camshaft 2 fluctuates according to the fluctuation in the load of the high-pressure fuel pump 8. The holding control value fluctuates according to the load torque.

[Fuel Pressure] The load torque applied to the exhaust valve camshaft 2 via the exhaust cams 4 from the exhaust valve side fluctuates according to the fluctuation in the combustion pressure of the combustion chamber. The holding control value fluctuates according to the load torque.

[Hydraulic Pressure] The operating oil temperature corresponding to the coolant temperature ethw is relatively low when the coolant temperature ethw is lower than 80° C. In this case, the hydraulic pressure is high. A higher hydraulic pressure greatly reduces the fluctuation range of the holding control value.

Figure 6:
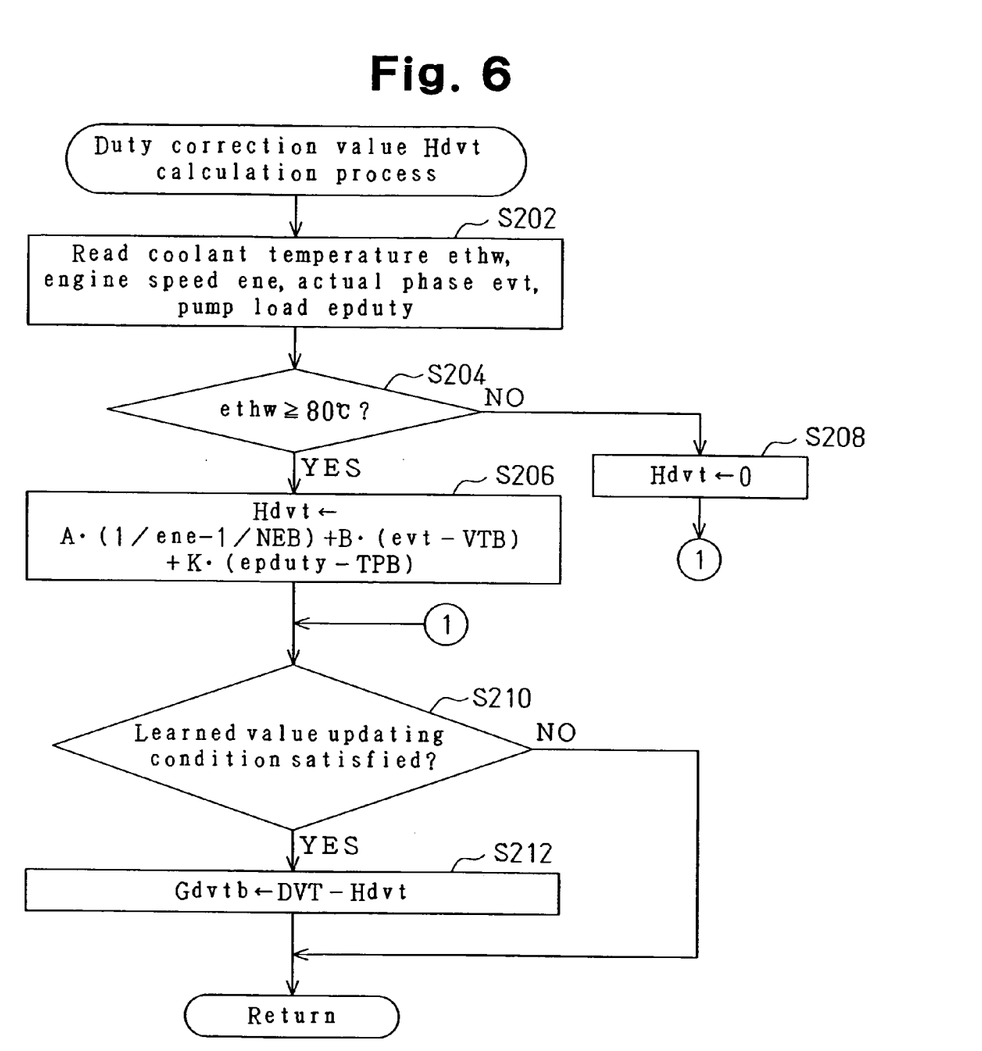
FIG. 6 is a flowchart of a duty correction value Hdvt calculation process.

The hydraulic pressure factor associated with the coolant temperature ethw is reflected by the process for setting the duty correction value Hdvt to zero when step S204 in the duty correction value Hdvt calculation process results in a negative determination (FIG. 6). The duty correction value Hdvt being set to zero is equivalent to A=B=K=0 in expression 2.

Further, the engine speed factor is reflected by the term A·(1/ene-1/NEB), and the spring force factor is reflected by the term B·(evt-VTB).

The high-pressure fuel pump load factor and the combustion pressure factor are together reflected by the term K·(epduty-TPB). To put the high-pressure fuel pump load factor and the combustion pressure factor separately, the high-pressure fuel pump load factor is reflected by the expression C·(epduty-PDB), and the combustion pressure factor is reflected by the expression D·(ewp-WPB). The coefficients C and D are used to convert the calculated values in the parentheses into duty values (%), and are constants in the first embodiment. In the expressions, ewp is an actual combustion pressure, PDB a freely set reference pump load (constant), and WPB is a freely set reference combustion pressure of the internal combustion engine (constant). The duty correction value Hdvt is calculated using expression 4 given below.

$$Hdvt \leftarrow A \cdot (1/ene - 1/NEB) + B \cdot (evt - VTB) + C \cdot (epduty - PDB) + D \cdot (ewp - WPB) \quad \text{Expression 4}$$

The pump load epduty also corresponds to the amount of fuel burned in the combustion chamber. This means that the pump load epduty is also a value reflecting the combustion pressure ewp. Thus, replacing the combustion pressure ewp with the pump load epduty enables the terms C·(epduty−PDB) and D·(ewp−WPB) to be combined into one term K·(epduty−TPB). These findings set expression 2.

The appropriateness of expression 2 as the simple physical model when the coolant temperature ethw is not lower than 80° C., and also the appropriateness of setting Hdvt=0 when the coolant temperature ethw is lower than 80° C. were confirmed through experiments.

For the valve timing control of the intake values in the variable valve timing mechanism 44, the spring force factor, the high-pressure fuel pump load factor, and the combustion pressure factor are eliminated, and the fluctuation range of the holding control value due to the engine speed factor is small. Thus, the valve timing control of the intake valves is executed by the same processes as the control duty calculation process (FIG. 5) and the duty correction value Hdvt calculation process (FIG. 6) except that the computation corresponding to expression 2 is not executed, and the duty correction value Hdvt is always set to zero.

Step S206 may be referred to as a correction value calculation process. Step S106 using "Gdvtb+Hdvt" may be referred to as a valve timing control process. Step S212 may be referred to as a learning process. The ECU 60 functions as a means for calculating a correction value, a means for controlling a valve timing, and a learning means.

The first embodiment has the advantages described below.

(i) The duty correction value Hdvt corresponds to the difference between the actual holding control value and the reference-state holding control value. The two holding control values are calculated using expression 2, which describes the physical model associated with the torque received by the exhaust valve camshaft 2, the spring force exerted by the advancing spring 18 for varying the rotational phase, and the hydraulic pressure of the operating oil.

Thus, even when a large number of factors contribute to the torque received by the exhaust valve camshaft 2, the spring force for varying the rotational phase, and the hydraulic pressure of the operating oil, the duty correction value Hdvt reflecting the states of all the fluctuation factors is easily calculated without requiring the use of a large number of maps individually having these fluctuation factors as parameters.

In particular, the influence of the hydraulic pressure on the other factors is reflected in the valve timing control. To be specific, the duty correction value Hdvt is set to zero when the coolant temperature ethw is relatively low and the hydraulic pressure is high. Thus, the duty correction value Hdvt considering mutual influences of the fluctuation factors is easily calculated without requiring a multidimensional map having all the fluctuation factors as parameters to be used.

Step S106 in the control duty calculation process (FIG. 5) substantially calculates the sum of the duty correction value Hdvt and the control reference value (holding duty learned value Gdvtb). Using a highly accurate holding control value (Gdvtb+Hdvt) according to the engine operational status enables favorable valve timing control to be executed in an actual engine without requiring a complex map to be used.

(ii) The load of the high-pressure fuel pump 8 greatly fluctuates according to the operational status of the engine. In view of this, a value resulting from the process for reducing short fluctuations of the pump load is used as the pump load epduty. This ensures stability in the valve timing control. The degree of reducing such short fluctuations is adjusted according to the engine load. This enables such fluctuations to be reduced appropriately, and improves responsiveness and stability in the valve timing control.

(iii) A value obtained by subtracting the duty correction value Hdvt from the control duty DVT, which corresponds to the holding control value obtained while the valve timing control is stabilized, is stored as the holding duty learned value Gdvtb. Thus, a value that is less likely to be influenced by the engine operational status etc., is learned as the holding duty learned value Gdvtb. Thus, even when opportunities for learning a value for the holding duty learned value Gdvtb are fewer, a highly accurate learned value is held at all times as the holding duty learned value Gdvtb. This enables favorable valve timing control to be executed in the actual engine.

A valve timing controller according to a second embodiment of the present invention will now be described.

In the second embodiment, the duty correction value Hdvt is calculated using expression 5 given below instead of using expression 2 in step S206 of the duty correction value Hdvt calculation process (FIG. 6). The remaining structure of the valve timing controller in the second embodiment is the same as that in the first embodiment. The second embodiment is described with reference to FIGS. 1 to 6.

$$Hdvt \leftarrow (P \cdot evt + Q - R \cdot epduty - W \cdot ewp - N)/(L \cdot J \cdot T \cdot ene) - (P \cdot VTB + Q - R \cdot PDB - W \cdot WPB - N)/(L \cdot J \cdot T \cdot NEB) \qquad \text{Expression 5}$$

In the expression, P is the spring constant of the advancing spring 18, Q is an offset value of the spring force exerted by the advancing spring 18, R is the cam torque generated per unit load of the high-pressure fuel pump 8, W is the cam torque generated per unit combustion pressure of the engine, N is an offset value of the cam torque, L is a characteristic value in hydraulic pressure control executed by the exhaust valve OCV 26, J is the hydraulic pressure sensitivity per unit revolution of crankshaft (engine speed), and T is the torque per net pressure of an operating fluid, which is generated per unit amount of operating fluid and is the difference between the hydraulic pressure of the advancing side pressurizing chambers 14e and the hydraulic pressure of the retarding side pressurizing chambers 14f. For the other symbols, refer to the explanation given in the first embodiment.

The following describes how expression 5 is derived.

First, in such a range of a control duty DUTY that enables the exhaust valve OCV 26 to substantially execute the hydraulic pressure control (e.g., 30 to 70%), the hydraulic pressure difference ΔPo between the advancing side pressurizing chambers 14e and the retarding side pressurizing chambers 14f of the exhaust variable valve timing mechanism 14 is expressed as expression 6 given below.

$$\Delta Po = L \cdot (DUTY - 50) \cdot Po \qquad \text{Expression 6}$$

In the expression, Po is the hydraulic pressure of the operating oil and is expressed as Po=J·ene. Thus, the hydraulic pressure difference ΔPo is expressed as expression 7 given below, into which expression 6 is transformed.

$$\Delta Po = L \cdot (DUTY - 50) \cdot J \cdot ene = L \cdot J \cdot (DUTY - 50) \cdot ene \qquad \text{Expression 7}$$

The control duty DUTY is expressed as expression 8 given below, into which expression 7 is transformed.

$$DUTY = \Delta Po/L \cdot J \cdot ene + 50 \qquad \text{Expression 8}$$

The total cam torque Tqc in the exhaust valve camshaft 2 is expressed as expression 9 given below.

$$Tqc = M \cdot ene + R \cdot epduty + W \cdot ewp + N \qquad \text{Expression 9}$$

In the expression, M is the cam torque sensitivity per unit revolution of the crankshaft (engine speed).

A hydraulic pressure difference $\Delta Px$ required to hold the valve timing (rotational phase) is expressed as expression 10 given below.

$$\Delta Px=(F-Tqc)/T \qquad \text{Expression 10}$$

In the expression, F is the spring force exerted by the advancing spring 18, and is expressed as $P \cdot evt+Q$. Thus, the holding duty Hduty is expressed as expression 11 given below.

$$Hduty=\Delta Px/L \cdot J \cdot ene+50=(P \cdot evt+Q-M \cdot ene-R \cdot epduty-W \cdot ewp-N)/L \cdot J \cdot T \cdot ene+50=(P \cdot evt+Q-R \cdot epduty-W \cdot ewp-N)/L \cdot J \cdot T \cdot ene-M/L \cdot J \cdot T+50 \qquad \text{Expression 11}$$

A reference-state holding duty HdutyB, which is the holding duty in a reference state, is expressed as expression 12 given below.

$$HdutyB=(P \cdot VTB+Q-R \cdot PDB-W \cdot WPB-N)/L \cdot J \cdot T \cdot NEB-M/L \cdot J \cdot T+50 \qquad \text{Expression 12}$$

The difference between the holding duty Hduty in expression 11 and the reference-state holding duty HdutyB in expression 12 corresponds to the duty correction value Hdvt. Thus, the duty correction value Hdvt is calculated using expression 13 given below.

$$Hdvt=(P \cdot evt+Q-R \cdot epduty-W \cdot ewp-N)/L \cdot J \cdot T \cdot ene-M/L \cdot J \cdot T+50-\{(P \cdot VTB+Q-R \cdot PDB-W \cdot WPB-N)/L \cdot J \cdot T \cdot NEB-M/L \cdot J \cdot T+50\}=(P \cdot evt+Q-R \cdot epduty-W \cdot ewp-N)/(L \cdot J \cdot T \cdot ene)-(P \cdot VTB+Q-R \cdot PDB-W \cdot WPB-N)/(L \cdot J \cdot T \cdot NEB) \qquad \text{Expression 13}$$

In this way, the duty correction value Hdvt is calculated using expression 5.

The second embodiment has the advantages described below.

(i) The duty correction value Hdvt calculated in the second embodiment corresponds to a difference between the holding duty Hduty, which is a holding control value, and the reference-state holding duty HdutyB, which is a holding control value in a reference state as described above. These holding control values are calculated using expression 5, which reflects the physical model associated with the torque received by the exhaust valve camshaft 2, the spring force exerted by the advancing spring 18 for varying the rotational phase, and the hydraulic pressure of the operating oil.

Like advantage (i) of the first embodiment, the duty correction value Hdvt considering mutual influences of the fluctuation factors is easily calculated without requiring the use of a multidimensional map having all the fluctuation factors as parameters. This enables favorable valve timing control to be executed in the actual engine.

(ii) The same advantages as advantages (ii) and (iii) of the first embodiment are obtained.

It should be apparent to those skilled in the art that the present invention may be embodied in many other specific forms without departing from the spirit or scope of the invention. Particularly, it should be understood that the present invention may be embodied in the following forms.

(a) In step S204 of the duty correction value Hdvt calculation process (FIG. 6), the state of the hydraulic pressure of the operating oil is determined by estimating the operating oil temperature based on the coolant temperature ethw. Alternatively, the state of the hydraulic pressure of the operating oil may be determined directly based on the temperature of the operating oil, which is detected by an oil temperature sensor.

(b) In step S208 of the duty correction value Hdvt calculation process (FIG. 6), the duty correction value Hdvt is set to zero. However, expression 2 with smaller absolute values of the coefficients A, B, and K may be applied to calculate the duty correction value Hdvt. For example, when the coolant temperature ethw is lower than 80° C., values of the coefficients A, B, and K may be reduced to ¼ to ¹⁄₁₀ of the values used when the coolant temperature ethw is not lower than 80° C.

The duty correction value Hdvt may be calculated using expression 4 instead of using expression 2. In this case, expression 4 may be applied with smaller absolute values of the coefficients A, B, C, and D to calculate the duty correction value Hdvt when the coolant temperature ethw is lower than 80° C.

(c) The pump load epduty is used instead of the combustion pressure ewp. However, the combustion pressure ewp itself may be used by estimating it from the engine operational status (e.g., the engine speed ene and the engine load) using a map or the like.

Further, as the physical amount in which the combustion pressure ewp is reflected, the engine output torque may be estimated from the engine operational status (e.g., the engine speed ene and the engine load) using a map or the like so that the estimated engine output torque is used instead of the combustion pressure ewp. Alternatively, the fuel injection amount may instead be used as the physical amount in which the combustion pressure ewp is reflected.

In the same manner, the engine output torque, the fuel injection amount or the combustion pressure ewp may instead be used as the physical amount in which the pump load epduty is reflected.

(d) When the coolant temperature ethw is not lower than 80° C., a further fluctuation in the coolant temperature ethw or a further fluctuation in the operating oil temperature is not considered. However, when the coolant temperature ethw is not lower than 80° C., too, a subtle fluctuation in the hydraulic pressure caused by a further fluctuation in the operating oil temperature may be reflected in the duty correction value Hdvt. For example, the duty correction value Hdvt may be calculated using expression 14 given below.

$$Hdvt \leftarrow A \cdot (1/ene-1/NEB)+B \cdot (evt-VTB)+C \cdot (epduty-PDB)+D \cdot (ewp-WPB)+E \cdot (eth-THB) \qquad \text{Expression 14}$$

The expression differs from expression 4 in the term $E \cdot (eth-THB)$, where eth is the operating oil temperature and THB is a reference operating oil temperature. The coolant temperature ethw may be used instead of the operating oil temperature eth.

As described in the first embodiment, the term $C \cdot (epduty-PDB)+D (ewp-WPB)$ may be transformed into $K \cdot (epduty-TPB)$. In other words, expression 14 may be transformed into expression 15 given below.

$$Hdvt \leftarrow A \cdot (1/ene-1/NEB)+B \cdot (evt-VTB)+K \cdot (epduty-TPB)+E \cdot (eth-THB) \qquad \text{Expression 15}$$

(e) When the advancing spring 18 is not used in the exhaust variable valve timing mechanism 14, the spring force factor is eliminated. In this case, for example in the first embodiment, expression 16 given below may be used instead of expression 2.

$$Hdvt \leftarrow A \cdot (1/ene-1/NEB)+K \cdot (epduty-TPB) \qquad \text{Expression 16}$$

In the second embodiment, expression 17 given below may be used instead of expression 5.

$$Hdvt \leftarrow (-R \cdot epduty - W \cdot ewp \cdot N)/(L \cdot J \cdot T \cdot ene) - (-R \cdot PDB - W \cdot WPB - N)/(L - J - T - NEB) \quad \text{Expression 17}$$

(f) In addition to an inline four-cylinder engine, the present invention is applicable to any internal combustion engine. For example, the present invention is applicable to a six-cylinder V-engine.

The present examples and embodiments are to be considered as illustrative and not restrictive, and the invention is not to be limited to the details given herein, but may be modified within the scope and equivalence of the appended claims.

What is claimed is:

1. A controller for controlling a variable valve timing mechanism that varies an operation timing of a valve camshaft for an internal combustion engine, wherein the variable valve timing mechanism varies a rotational phase of the valve camshaft with respect to a crank angle by controlling pressure of an operating fluid, the controller comprising:

a calculation means for calculating a correction value using an arithmetic expression reflecting a physical model that is associated with torque applied to the valve camshaft and the pressure of the operating fluid, wherein the correction value is the difference between a holding control value for fixing the rotational phase and a reference-state holding control value, the holding control value being calculated from the torque applied to the valve camshaft and the pressure of the operating fluid, and the reference-state holding control value being calculated from a reference torque and a reference pressure; and a valve timing controlling means for generating an updated holding control value that includes the sum of the correction value and a predetermined control reference value, and controlling the valve timing in accordance with the updated holding control value.

2. The controller according to claim 1, further comprising:

a learning means for generating a learned value by subtracting the correction value from the updated holding control value when the valve timing control is stabilized and holding the learned value, wherein the valve timing controlling means uses the held learned value as the control reference value.

3. A controller for controlling a variable valve timing mechanism that varies an operation timing of a valve camshaft for an internal combustion engine, wherein the variable valve timing mechanism varies a rotational phase of the valve camshaft with respect to a crank angle by controlling pressure of an operating fluid, the controller comprising:

a calculation means for calculating a correction value using an arithmetic expression reflecting a physical model that is associated with torque applied to the valve camshaft, a spring force for varying the rotational phase, and the pressure of the operating fluid, wherein the correction value is the difference between a holding control value for fixing the rotational phase and a reference-state holding control value, the holding control value being calculated from the torque applied to the valve camshaft, the spring force for varying the rotational phase, and the pressure of the operating fluid, and the reference-state holding control value being calculated from a reference torque, a reference spring force, and a reference pressure; and a valve timing controlling means for generating an updated holding control value, which includes the sum of the correction value and a predetermined control reference value, and controlling the valve timing in accordance with the updated holding control value.

4. The controller according to claim 3, wherein the valve camshaft is an exhaust valve camshaft, the internal combustion engine further includes coolant, the pressure of the operating fluid is generated by a pump driven by the internal combustion engine and includes pressure that is in accordance with engine speed, and the torque applied to the valve camshaft includes a cam torque that is in accordance with the engine speed, a load torque that is in accordance with load of an auxiliary device driven by the valve camshaft, and a cam torque that is in accordance with combustion pressure of the internal combustion engine; and when the temperature of the operating fluid or the temperature of the coolant is higher than a low-temperature determination value, the calculation means calculates the correction value using the arithmetic expression:

$$\text{correction value} = (P \cdot evt + Q - R \cdot epduty - W \cdot ewp - N)/(L \cdot J \cdot T \cdot ene) - (P \cdot VTB + Q - R \cdot PDB - W \cdot WPB - N)/(L \cdot J \cdot T \cdot NEB),$$

where P is the spring constant of the spring force, evt is the rotational phase, Q is an offset value of the spring force, R is cam torque per unit load of the auxiliary device, epduty is the load of the auxiliary device, W is cam torque per unit combustion pressure of the internal combustion engine, ewp is the combustion pressure of the internal combustion engine, N is an offset value of the cam torque, L is a characteristic value in pressure control of the operating fluid, J is an operating fluid pressure sensitivity per unit engine speed, T is torque per net pressure of the operating fluid generated by a unit amount of operating fluid, ene is the engine speed, VTB is a reference rotational phase, PDB is a reference load of the auxiliary device, WPB is a reference combustion pressure of the internal combustion engine, and NEB is a reference engine speed.

5. The controller according to claim 4, wherein the calculation means sets the correction value to zero when the temperature of the operating fluid or the temperature of the coolant is lower than the low-temperature determination value.

6. The controller according to claim 4, wherein the calculation means uses a physical amount reflecting actual load of the auxiliary device or actual combustion pressure as the load of the auxiliary device or as the combustion pressure.

7. The controller according to claim 4, wherein the auxiliary device includes a high-pressure fuel pump.

8. The controller according to claim 7, wherein the calculation means executes a process for reducing short fluctuations of a value of the load of the auxiliary device or a value of the load torque that is in accordance with the load of the auxiliary device.

9. The controller according to claim 8, wherein the calculation means adjusts the degree of reduction of the short fluctuations in accordance with load of the internal combustion engine.

10. The controller according to claim 3, wherein the valve camshaft is an exhaust valve camshaft, the internal combustion engine further includes coolant, the pressure of the operating fluid is generated by a pump driven by the internal combustion engine and includes pressure that is in accordance with engine speed, and the torque applied to the valve camshaft includes a cam torque that is in accordance with the engine speed, a load torque that is in accordance with load of an auxiliary device driven by the valve camshaft, and a cam torque that is in accordance with combustion pressure of the internal combustion engine; and when the temperature of the operating fluid or the temperature of the coolant is higher than a low-temperature determination value, the calculation means calculates the correction value using the arithmetic expression:

correction value=$A \cdot (1/ene - 1/NEB) + B \cdot (evt - VTB) + C \cdot (epduty - PDB) + D \cdot (ewp - WPB)$, where A, B, C, and D are constants, ene is the engine speed, NEB is a reference engine speed, evt is the rotational phase, VTB is a reference rotational phase, epduty is the load of the auxiliary device, PDB is a reference load of the auxiliary device, ewp is the combustion pressure of the internal combustion engine, and WPB is a reference combustion pressure of the internal combustion engine.

11. The controller according to claim 10, wherein when the temperature of the operating fluid or the temperature of the coolant is lower than the low-temperature determination value, the calculation means calculates the correction value with the arithmetic expression in which the absolute values of the constants A, B, C, and D are smaller than when the temperature of the operating fluid or the temperature of the coolant is higher than the low-temperature determination value.

12. The controller according to claim 10, wherein the calculation means sets the correction value to zero when the temperature of the operating fluid or the temperature of the coolant is lower than the low-temperature determination value.

13. The controller according to claim 10, wherein the calculation means uses a physical amount reflecting actual load of the auxiliary device or actual combustion pressure as the load of the auxiliary device or as the combustion pressure.

14. The controller according to claim 10, wherein the auxiliary device includes a high-pressure fuel pump.

15. The controller according to claim 14, wherein the calculation means executes a process for reducing short fluctuations of a value of the load of the auxiliary device or a value of the load torque that is in accordance with the load of the auxiliary device.

16. The controller according to claim 14, wherein the calculation means adjusts the degree of reduction of the short fluctuations in accordance with load of the internal combustion engine.

17. The controller according to claim 3, wherein the valve camshaft is an exhaust valve camshaft, the internal combustion engine further includes coolant, the pressure of the operating fluid is generated by a pump driven by the internal combustion engine and includes pressure that is in accordance with engine speed, and the torque applied to the valve camshaft includes a cam torque that is in accordance with the engine speed, a load torque that is in accordance with load of an auxiliary device driven by the valve camshaft, and a cam torque that is in accordance with combustion pressure of the internal combustion engine; and when the temperature of the operating fluid or the temperature of the coolant is higher than a low-temperature determination value, the calculation means calculates the correction value using the arithmetic expression:

correction value=$A \cdot (1/ene - 1/NEB) + B \cdot (evt - VTB) + K \cdot (epduty - TPB)$, where A, B, and K are constants, ene is the engine speed, NEB is a reference engine speed, evt is the rotational phase, VTB is a reference rotational phase, epduty is the load of the auxiliary device, and TPB is a reference value.

18. The controller according to claim 17, wherein when the temperature of the operating fluid or the temperature of the coolant is lower than the low-temperature determination value, the calculation means calculates the correction value with the arithmetic expression in which the absolute values of the constants A, B, and K are smaller than when the temperature of the operating fluid or the temperature of the coolant is higher than the low-temperature determination value.

19. The controller according to claim 17, wherein the calculation means sets the correction value to zero when the temperature of the operating fluid or the temperature of the coolant is lower than the low-temperature determination value.

20. The controller according to claim 17, wherein the calculation means uses a physical amount reflecting actual load of the auxiliary device or actual combustion pressure as the load of the auxiliary device or as the combustion pressure.

21. The controller according to claim 17, wherein the auxiliary device includes a high-pressure fuel pump.

22. The controller according to claim 21, wherein the calculation means executes a process for reducing short fluctuations of a value of the load of the auxiliary device or a value of the load torque that is in accordance with the load of the auxiliary device.

23. The controller according to claim 22, wherein the calculation means adjusts the degree of reduction of the short fluctuations in accordance with load of the internal combustion engine.

24. The controller according to claim 3, wherein the valve camshaft is an exhaust valve camshaft, the internal combustion engine further includes coolant, the pressure of the operating fluid is generated by a pump driven by the internal combustion engine and includes pressure that is in accordance with engine speed and pressure that is in accordance with temperature of the operating fluid, and the torque applied to the valve camshaft includes a cam torque that is in accordance with the engine speed, a load torque that is in accordance with load of an auxiliary device driven by the valve camshaft, and a cam torque that is in accordance with combustion pressure of the internal combustion engine; and when the temperature of the operating fluid or the temperature of the coolant is higher than a low-temperature determination value, the calculation means calculates the correction value using the arithmetic expression:

correction value=$A \cdot (1/ene - 1/NEB) + B \cdot (evt - VTB) + C \cdot (epduty - PDB) + D \cdot (ewp - WPB) + E \cdot (eth - THB)$, where A, B, C, D, and E are constants, ene is the engine speed, NEB is a reference engine speed, evt is the rotational phase, VTB is a reference rotational phase, epduty is the load of the auxiliary device, PDB is a reference load of the auxiliary device, ewp is the combustion pressure of the internal combustion engine, WPB is a reference combustion pressure of the internal combustion engine, eth is the temperature of the operating fluid, and THB is a reference operating fluid temperature.

25. The controller according to claim 24, wherein when the temperature of the operating fluid or the temperature of the coolant is lower than the low-temperature determination value, the calculation means calculates the correction value with the arithmetic expression in which the absolute values of the constants A, B, C, and D are smaller than when the temperature of the operating fluid or the temperature of the coolant is higher than the low-temperature determination value.

26. The controller according to claim 24, wherein the calculation means sets the correction value to zero when the temperature of the operating fluid or the temperature of the coolant is lower than the low-temperature determination value.

27. The controller according to claim 24, wherein the calculation means uses a physical amount reflecting actual load of the auxiliary device or actual combustion pressure as the load of the auxiliary device or as the combustion pressure.

28. The controller according to claim 24, wherein the auxiliary device includes a high-pressure fuel pump.

29. The controller according to claim 28, wherein the calculation means executes a process for reducing short fluctuations of a value of the load of the auxiliary device or a value of the load torque that is in accordance with the load of the auxiliary device.

30. The controller according to claim 29, wherein the calculation means adjusts the degree of reduction of the short fluctuations in accordance with load of the internal combustion engine.

31. The controller according to claim 3, further comprising:
a learning means for generating a learned value by subtracting the correction value from the updated holding control value when the valve timing control is stabilized and holding the learned value,
wherein the valve timing controlling means uses the held learned value as the control reference value.

32. A method for controlling a variable valve timing mechanism that varies an operation timing of a valve camshaft for an internal combustion engine, wherein the variable valve timing mechanism varies a rotational phase of the valve camshaft with respect to a crank angle by controlling pressure of an operating fluid, the method comprising:
calculating a correction value using an arithmetic expression reflecting a physical model that is associated with torque applied to the valve camshaft and the pressure of the operating fluid, wherein the correction value is the difference between a holding control value for fixing the rotational phase and a reference-state holding control value, the holding control value being calculated from the torque applied to the valve camshaft and the pressure of the operating fluid, and the reference-state holding control value being calculated from a reference torque and a reference pressure;
generating an updated holding control value that includes a sum of the correction value and a predetermined control reference value; and
controlling the valve timing in accordance with the updated holding control value.

33. A method for controlling a variable valve timing mechanism that varies an operation timing of a valve camshaft for an internal combustion engine, wherein the variable valve timing mechanism varies a rotational phase of the valve camshaft with respect to a crank angle by controlling pressure of an operating fluid, the method comprising:
calculating a correction value using an arithmetic expression reflecting a physical model that is associated with torque applied to the valve camshaft, a spring force for varying the rotational phase, and the pressure of the operating fluid, wherein the correction value is the difference between a holding control value for fixing the rotational phase and a reference-state holding control value, the holding control value being calculated from the torque applied to the valve camshaft, the spring force for varying the rotational phase, and the pressure of the operating fluid, and the reference-state holding control value being calculated from a reference torque, a reference spring force, and a reference pressure;
generating an updated holding control value that includes the sum of the correction value and a predetermined control reference value; and
controlling the valve timing in accordance with the updated holding control value.

* * * * *